United States Patent [19]
Girotra et al.

[11] 3,920,637
[45] Nov. 18, 1975

[54] CHEMICAL COMPOUNDS AND PROCESSES

[75] Inventors: Narindar N. Girotra, Fords; Norman L. Wendler, Summit, both of N.J.

[73] Assignee: Merck & Co., Inc., Rahway, N.J.

[22] Filed: Apr. 24, 1974

[21] Appl. No.: 463,623

Related U.S. Application Data

[63] Continuation-in-part of Ser. No. 274,388, July 24, 1972, abandoned.

[52] U.S. Cl. ...... 260/240 R; 260/240 G; 260/243 R; 260/243 C; 260/999
[51] Int. Cl.² ......................................... C07D 405/12
[58] Field of Search ......... 260/240 G, 243 C, 240 R

[56] References Cited
UNITED STATES PATENTS
3,592,810  7/1971  Dolfini ............................ 260/240 R

OTHER PUBLICATIONS

Heymes et al., Chem. Abstract 68, No. 9584.
Amiard et al., Chem. Abstract 68, No. 69011.
Heymes et al., Chem. Abstract 69, No. 59258.

*Primary Examiner*—Arthur P. Demers
*Attorney, Agent, or Firm*—Julian S. Leavitt; Jerome J. Behan

[57] ABSTRACT

1,2,5,7-tetrahydro-7-oxo-α-phthalimido-4H-furo[3,4-d][1,3]thiazine-2-acetic acid esters which are useful in the synthesis of cephalosporins are prepared starting with γ,γ'-dihydroxyvaline lactone hydrochloride I and phthalimidomalonaldehydic esters II.

14 Claims, No Drawings

CHEMICAL COMPOUNDS AND PROCESSES

This is a continuation-in-part of the co-pending application Ser. No. 274,388 filed July 24, 1972, now abandoned.

BACKGROUND OF THE INVENTION

This invention relates to processes and chemical compounds useful in the synthesis of antibiotics. More particularly, it is concerned with processes for preparing intermediate products which can be used in the total synthesis of cephalosporins.

Cephalosporins such as cephalothin and cephaloridine have been found to be valuable antibiotics which are very useful in human therapy. These antibiotics are generally prepared from cephalosporin C, an antibiotic substance which is produced by growing certain microorganisms in suitable fermentation media. The cephalosporin C after isolation from the fermentation broth is converted to 7-aminocephalosporanic acid by removing the aminoadipoyl side chain. The 7-aminocephalosporanic acid is then reacylated to produce the cephalosporin compound having a thienylacetyl side chain. This method of preparing these antibiotics is expensive since the fermentation yield of cephalosporin C is low and the step of replacing the acyl side chain is difficult to carry out on a commercial scale in high yields. Accordingly, other methods of producing these valuable antibiotics have been avidly sought by those skilled in this art.

The total synthesis of cephalosporins has been described by several investigators. One such synthesis uses as an intermediate an ester of 1,2,5,7-tetrahydro-7-oxo-α-phthalimido-4H-furo[3,4-d][1,3]thiazine-2-acetic acid.

SUMMARY OF THE INVENTION

It is an object of this invention to provide a new synthesis of 1,2,5,7-tetrahydro-7-oxo-α-phthalimido-4H-furo[3,4-d][1,3]-thiazine-2-acetic acid esters. Another object is to provide new intermediate products useful in this synthesis. Other objects will be apparent from the detailed description of this invention hereinafter provided.

In accordance with the present invention, it is now found that 1,2,5,7-tetrahydro-7-oxo-α-phthalimido-4H-furo[3,4-d][1,3]thiazine-2-acetic acid esters are prepared from γ,γ'-dihydroxyvaline lactone hydrochloride I and phthalimidomalonaldehydic esters II by the processes shown in the following flowsheet:

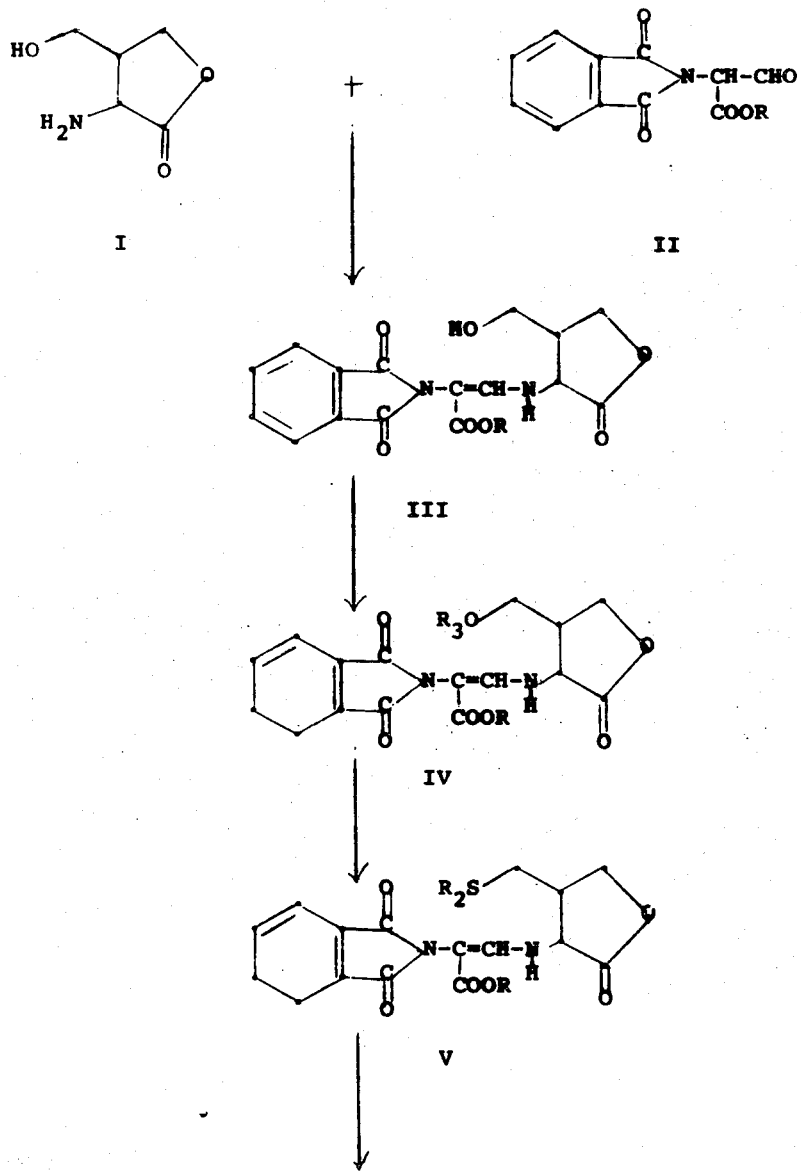

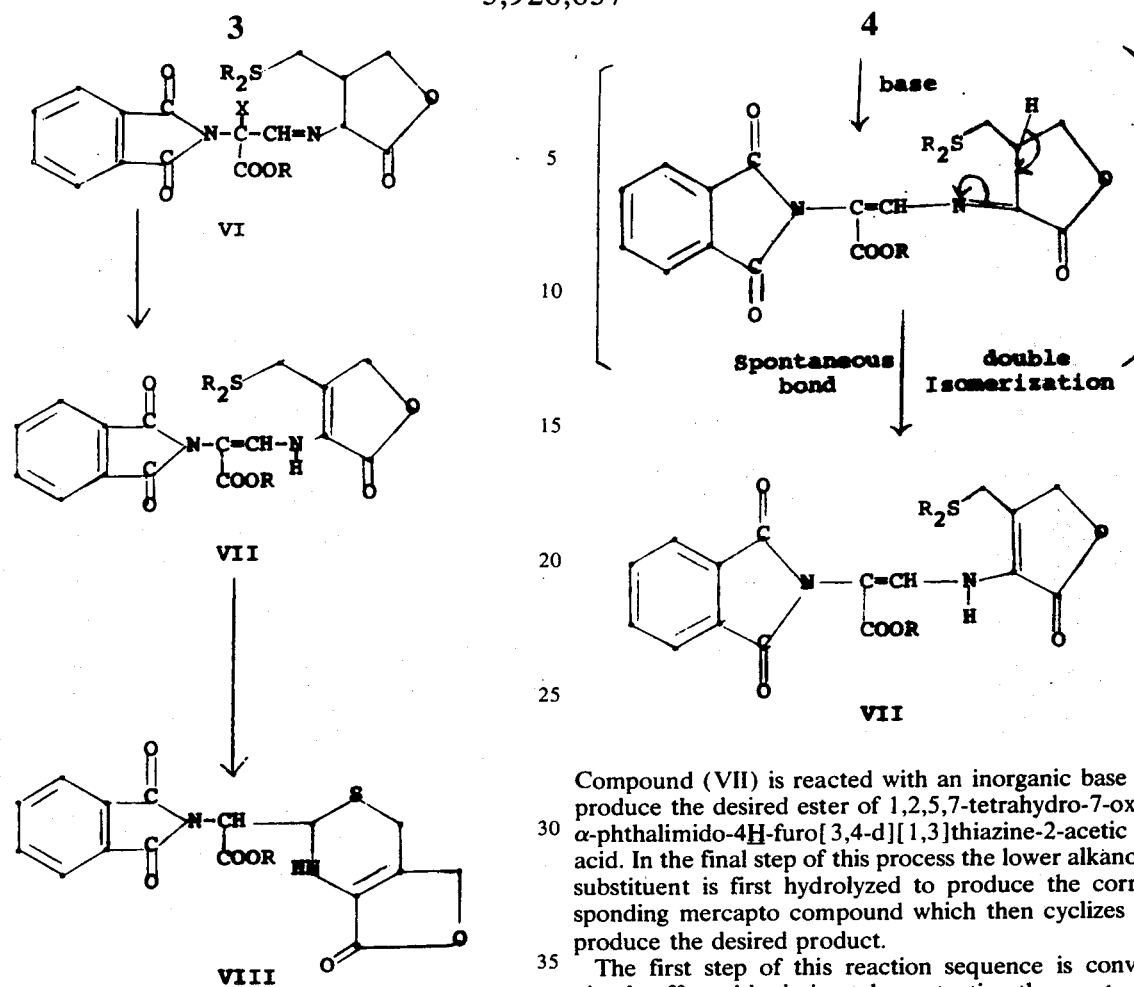

Wherein X represents halogen, R represents a lower alkyl ($C_1$–$C_6$) group, $R_2$ represents aroyl or lower alkanoly alkanoyl 2–$C_6$) group, and $R_3$ is an alkyl, aralkyl or monocyclic aryl sulfonyl group.

In this process an acid salt of γ,γ'-dihydroxyvaline lactone (I) is reacted with a lower alkyl α-phthalimidomalonaldehydic ester (II) to produce dihydro-3-[(2-(tert-butoxycarbonyl)-2-phthalimidovinyl-)amino]-4-(hydroxymethyl)-2(3H)-furanone (III). This intermediate is then reacted with an alkyl, aralkyl or monocyclic aryl sulfonyl halide to produce the furanone sulfonate (IV) and the latter product is reacted with a salt of a thioaromatic or thioalkanoic acid ($C_2$–$C_6$) to produce the desired intermediate (V). The furanone compound (V) is reacted with an active halogen containing compound to produce the intermediate 2-haloethylideneamino compound (VI), the latter compound is reacted with a tertiary amine to produce the vinyl amino compound (VII). The conversion of VI to VII may be formulated as a dehydrohalogenation followed by a completely unexpected double bond isomerization which results in unsaturation of the furanone ring as illustrated below:

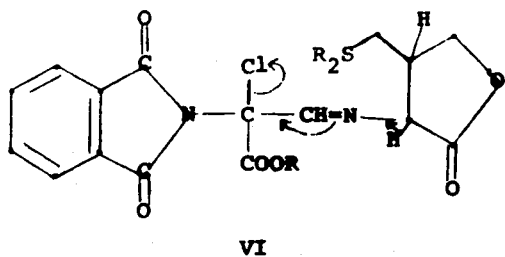

Compound (VII) is reacted with an inorganic base to produce the desired ester of 1,2,5,7-tetrahydro-7-oxo-α-phthalimido-4H-furo[3,4-d][1,3]thiazine-2-acetic acid. In the final step of this process the lower alkanoyl substituent is first hydrolyzed to produce the corresponding mercapto compound which then cyclizes to produce the desired product.

The first step of this reaction sequence is conveniently effected by intimately contacting the reactants in aqueous methanol in the presence of sodium acetate at room temperature. After the reaction is complete, the desired product is recovered by removing the methanol and extracting the aqueous solution of the product with a suitable solvent such as ethyl acetate. The furanone compound (III) so obtained consists of a mixture of the cis and trans isomers, processed without separation in the ensuing steps.

The second step of the reaction sequence is carried out by reacting the furanone compound with an alkyl, aralkyl or monocyclic aryl sulfonyl halide such as methane sulfonyl chloride, benzyl sulfonyl chloride or p-toluene sulfonyl chloride at 0°C. in the presence of an acid scavenger, for example a tertiary base such as pyridine. After completion of the reaction, the mixture is quenched and the desired product (IV) is recovered by evaporating the benzene extracts. The intermediate product IV thus obtained is also produced as a mixture of the cis and trans isomers which is used directly in the next step.

The step for the preparation of V is effected by reacting the sulfonate with a salt of a thioaromatic or a thioalkanoic acid, for example sodium thiobenzoate or potassium thioacetate. The reaction is readily effected in a suitable solvent media such as acetone by heating to reflux. After completion of the reaction, the mixture is filtered and the filtrate evaporated to afford V consisting essentially of the trans isomer. This product is used directly in the process described below for the preparation of VIII.

The steps of this reaction sequence are conveniently effected by reacting V with a compound containing an active halogen such as N-chlorosuccinimide or a lower alkyl ($C_1$–$C_6$) hypohalite such as t-butyl hypohalite, at low temperatures, i.e., about 0°C., in a suitable solvent medium such as methylene chloride. After completion of the reaction, the desired product, intermediate product VI, is obtained by evaporating the solution to dryness. The product so obtained is reacted with a tertiary amine such as pyridine at a temperature of about 60°C. or a stronger base such as 1,4-diazabicyclo[2:2:2]octane at 0°C. to afford the intermediate product VII. The latter product is obtained as a mixture of the cis and trans isomers which can be separated by chromatography on silica gel to afford the individual isomers.

The last step of the reaction sequence is effected by reacting the mixture of the cis and trans isomers of VII with an equivalent of an inorganic base such as sodium or potassium carbonate under such conditions as to effect the differential hydrolysis of the alkanoyl substituent and effect the desired cyclization. After completion of the reaction, the mixture is neutralized with acid and the desired product VIII is recovered by evaporation of the reaction mixture, as essentially one isomeric form.

EXAMPLE 1

To a stirred solution of 0.336 g. of $\gamma,\gamma'$-dihydroxyvaline lactone hydrochloride in 6 ml. of methanol and 0.6 ml. of water is added 0.273 g. of sodium acetate trihydrate followed by 0.580 g. of t-butyl $\alpha$-phthalimidomalonaldehydate [J. C. Sheehan and D. A. Johnson, J. Am. Chem. Soc., 76, 158 (1954)] at room temperature under nitrogen. The latter dissolves in about 5 minutes to give a bright yellow solution. After 24 hours at room temperature, the reaction mixture is evaporated to remove methanol. The residue is dissolved in ethyl acetate, the organic layer is extracted with water twice, 5% sodium bicarbonate thrice, saturated sodium chloride once, dried and evaporated to yield 0.802 g. of a mixture of the cis and trans isomers of dihydro-3-[(2-(tert-butoxycarbonyl)-2-phthalimidovinyl)amino]-4-(hydroxymethyl)-2(3$\underline{H}$)-furanone III as a yellow amorphous solid.
IR$\lambda_{max.}^{CHCl_3}$ 2.7–3.10, 5.59, 5.66, 5.80, 5.92, 6.0–6.20, 8.70 and 11.28$\mu$.

EXAMPLE 2

To a stirred solution of 1.660 g. of dihydro-3-[(2-(tert-butoxycarbonyl)-2-phthalimidovinyl)amino]-4-(hydroxymethyl)-23$\underline{H}$)-furanone in 5 ml. of dry pyridine is added 0.839 g. of p-toluenesulfonyl chloride at 0°C. under nitrogen. After 16 hours at 0°C. the reaction mixture is quenched with a small amount of ice and diluted with benzene. The organic layer is extracted with water three times, saturated aqueous sodium dihydrogen phosphate thrice and saturated sodium chloride once. The dried organic layer is evaporated to give 2.20 g. of (cis and trans) dihydro-3-[(2-(tert-butoxycarbonyl)-2-phthalimidovinyl)amino]-4-(hydroxymethyl)-2(3$\underline{H}$)-furanone p-toluenesulfonate as yellow amorphous solid.
IR$\lambda_{max.}^{CHCl_3}$ 6.28, 7.34 and 8.50$\mu$.

EXAMPLE 3

A stirred mixture of 2.44 g. of dihydro-3-[(2-(tert-butoxycarbonyl)-2-phthalimidovinyl)amino]-4-(hydroxymethyl)-2(3$\underline{H}$)-furanone p-toluenesulfonate, prepared as described in Example 2, and 0.915 g. of potassium thioacetate in 100 ml. of acetone is heated to reflux for 1 hour under nitrogen. The cooled reaction mixture is filtered through diatomaceous earth and the filtrate evaporated to give 1.86 g. of yellow foam which is stirred in ether and the resulting solid on crystallization affords 1.10 g. of dihydro-3-[(2-(tert-butoxycarbonyl)-2-phthalimidovinyl)amino]-4-(acetylthiomethyl)-2(3$\underline{H}$)-furanone (essentially trans isomer), m.p. 189°–193°C. The mother liquor is purified via dry column chromatography on silica gel using a mixture of ethyl acetate and benzene (40:60) as eluent to give 0.085 g. of cis-dihydro-3-[(2-(tert-butoxycarbonyl)-2-phthalimidovinyl)amino]-4-(acetylthiomethyl)-2(3$\underline{H}$)-furanone, m.p. 172°–176°C. and 0.10 g. of additional trans isomer, m.p. 189.5°–192.5°C. cis-dihydro-3-[(2-(tert-butoxycarbonyl)-2-phthalimidovinyl)amino]-4-(acetylthiomethyl)-2(3$\underline{H}$)-furanone:
IR$\lambda_{max.}^{CHCl_3}$ 2.70, 3.04, 5.55, 5.59, 5.80, 5.94, 6.14, 8.66 and 11.29$\mu$. UV$\lambda_{max.}^{MeOH}$ 280 ($\epsilon$=21800), 238 (15100), 231 (17100), 217.5 m$\mu$ (43500).
trans-dihydro-3-[(2-tert-butoxycarbonyl)-2-phthalimidovinyl)amino]-4-(acetylthiomethyl)-2(3$\underline{H}$)-furanone:
IR$\lambda_{max.}^{CHCl_3}$ 2.70, 2.80, 2.90–3.0, 5.59, 5.80, 5.90, 6.04 6.20, 8.6–8.80 and 11.29$\mu$. UV$\lambda_{max.}^{MeOH}$ 273 ($\epsilon$=25800), 237.5 (16000), 230 (18500), 217.5 m$\mu$ (42800).

EXAMPLE 4

To a stirred solution of 4.60 g. of the mixture of the cis and trans isomers of dihydro-3-[(2-(tert-butoxycarbonyl)-2-phthalimidovinyl)amino]-4-(acetylthiomethyl)-2(3$\underline{H}$)-furanone in 100 ml. of dry methylene chloride is added a solution of 1.096 g. of t-butylhypochlorite in 5 ml. of methylene chloride in 5 minutes at 0°C. under nitrogen. After 1 hour at 0°C. the reaction mixture is evaporated to give dihydro-3-[(2-(tert-butoxycarbonyl)-2-chloro-2-phthalimdoethylidene)amino]-4-(acetylthiomethyl)-2(3$\underline{H}$)-furanone as moisture-sensitive foam which is dissolved in 40 ml. of dry benzene and treated with 3.6 ml. of dry pyridine at 60°C. for 5 hours under nitrogen. The reaction mixture is evaporated to dryness, the residue dissolved in methylene chloride and extracted with water three times. The dried organic layer is evaporated to give 4.60 g. of semi-crystalline material which on crystallization from acetone-hexane affords 4.14 g. of (cis and trans) 3-[(2-(tert-butoxycarbonyl)-2-phthalimidovinyl)-amino]-4-(acetylthiomethyl)-2(5$\underline{H}$)-furanone in 3 crops.

A small amount of 3-[(2-(tert-butoxycarbonyl)-2-phthalimidovinyl)amino]-4-(acetylthiomethyl)-2(5$\underline{H}$)-furanone is chromatographed on silica gel to give cis-3-[(2-(tert-butoxycarbonyl)-2-phthalimidovinyl)amino]-4-(acetylthiomethyl)-2(5$\underline{H}$)-furanone (m.p. 166°–172°C.),
UV$\lambda_{max.}^{MeOH}$ 310 ($\epsilon$=26500), 264 (8350), 239 (15100) and 217 m$\mu$ (46700).
and trans-3-[(2-(tert-butoxycarbonyl)-2-phthalimidovinyl)amino]-4-(acetylthiomethyl)-2(5$\underline{H}$)-furanone (m.p. 186°–188°C.),
UV$\lambda_{max.}^{MeOH}$ 304 ($\epsilon$=29700), 265 (12800), 238 (16500) and 218 m$\mu$ (45800).

EXAMPLE 5

To a stirred solution of 1.10 g. of the mixture of the cis and trans isomers of 3-[(2-(tert-butoxycarbonyl)-2-phthalimidovinyl)amino]-4-(acetylthiomethyl)-2(5$\underline{H}$)-furanone in 250 ml. of methanol is added 6 ml. of 0.4 molar aqueous potassium carbonate in 10 minutes at 0°C. under nitrogen. After one-half hour at 0°C. acetic acid (0.14 ml.) is added and the reaction mixture evaporated. The residue is dissolved in ethyl acetate and extracted with water once, 5% sodium bicarbonate twice, water once, and saturated sodium chloride once. The dried organic layer is evaporated to give 0.864 g. of solid which on crystallization from a mixture of chloroform and hexane affords 0.781 g. of 1,2,5,7-tetrahydro-7-oxo-α-phthalimido-4H-furo[3,4-d][1,3]thiazine-2-acetic acid tert-butyl ester, m.p. 183°–186°C. IR$\lambda_{max}^{CHCl_3}$ 2.70–2.80, 2.93, 5.67, 5.77, 5.82, 5.91, 6.20 and 11.41μ. UV$\lambda_{max}^{ethanol}$ 268 (ϵ=5200), 239 (13000) and 218 mμ (44700).

What is claimed is:

1. The process which comprises reacting γ,γ'-dihydroxyvaline lactone with a lower alkyl α-phthalimidomalonaldehydate to produce the corresponding ester of dihydro-3-[(2-carboxy-2-phthalimidovinyl)amino]-4-(hydroxymethyl)-2(3H)-furanone, treating this compound with an alkyl, aralkyl or monocyclic aryl sulfonyl halide to obtain the corresponding arylsulfonate, and reacting this compound with a thioalkanoic or thioaromatic acid salt to produce a compound of the formula:

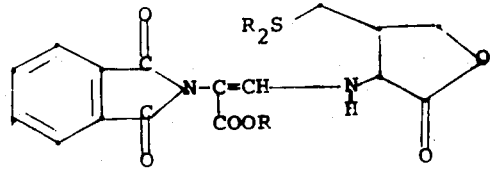

wherein R is lower alkyl and R$_2$ is lower alkanoyl.

2. The process of claim 1 wherein the lower alkyl ester is the t-butyl ester and the monocyclic aryl sulfonyl halide is p-toluenesulfonyl chloride.

3. The process of claim 1 wherein the lower alkanoylthio acid salt is an alkali metal salt of thioacetic acid.

4. The process of claim 1 which comprises reacting γ,γ'-dihydroxyvaline lactone with t-butyl α-phthalimidomalonaldehydate to produce dihydro-3-[(2-(tert-butoxycarbonyl)-2-phthalimidovinyl)amino]-4-(hydroxymethyl)-2(3H)-furanone, treating this compound with p-toluenesulfonyl chloride to obtain dihydro-3-[(2-(tert-butoxycarbonyl)-2-phthalimidovinyl)amino]-4-(hydroxymethyl)-2(3H)-furanone p-toluenesulfonate, and reacting this compound with potassium thioacetate to produce dihydro-3-[(2-(tert-butoxycarbonyl)-2-phthalimidovinyl)amino]-4-(acetylthiomethyl)-2(3H)-furanone.

5. A compound of the formula:

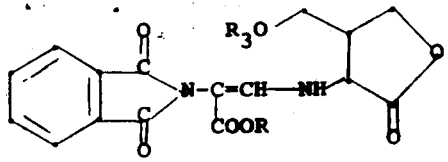

wherein R is lower alkyl and R$_3$ is an alkyl, aralkyl or monocyclic arylsulfonyl or hydrogen.

6. Dihydro-3-[(2-(tert-butoxycarbonyl)-2-phthalimidovinyl)amino]-4-(hydroxymethyl)-2(3H)-furanone p-toluenesulfonate.

7. Dihydro-3-[(2-(tert-butoxycarbonyl)-2-phthalimidovinyl)amino]-4-(hydroxymethyl)-2(3H)-furanone.

8. A compound of the formula:

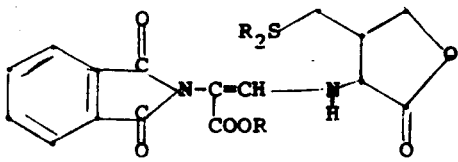

wherein R is lower alkyl and R$_2$ is lower alkanoyl.

9. Dihydro-3-[(2-(tert-butoxycarbonyl)-2-phthalimidovinyl)amino]-4-(acetylthiomethyl)-2(3H)-furanone.

10. The process which comprises reacting a compound of the formula:

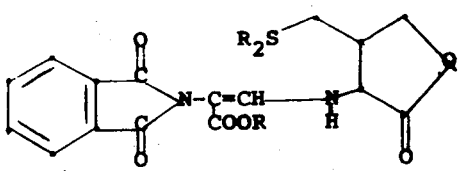

wherein R is lower alkyl and R$_2$ is lower alkanoyl with an active halogen containing compound at low temperatures and treating the resulting reaction product with a base at a temperature of from about 0° to 60°C. to produce a compound of the formula:

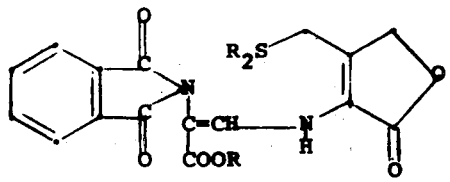

where R and R$_2$ are the same as defined above.

11. The process of claim 10 wherein the halogen compound is t-butylhypochlorite and the base is pyridine or 1,4-diazabicyclo[2:2:2]octane.

12. The process which comprises reacting dihydro-3-[(2-(tert-butoxycarbonyl)-2-phthalimidovinyl)amino]-4-(acetylthiomethyl)-2(3H)-furanone with t-butylhypochlorite and reacting the resulting reaction product with pyridine to produce 3-[(2-(tert-butoxycarbonyl)-2-phthalimidovinyl)amino]-4-(acetylthiomethyl)-2(5H)-furanone.

13. A compound of the formula:

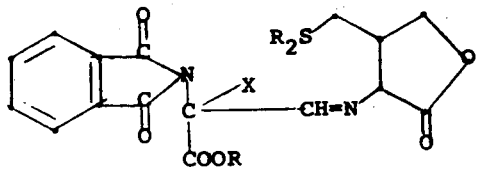

wherein R is lower alkyl, R$_2$ is lower alkanoyl and X is halogen.

14. Dihydro-3-[(2-(tert-butoxycarbonyl)-2-chloro-2-phthalimidoethylidene)amino]-4-(acetylthiomethyl)-2(3H)-furanone.

* * * * *